United States Patent [19]
Karasudani

[11] 4,051,927
[45] Oct. 4, 1977

[54] DISC BRAKE

[75] Inventor: Yasuo Karasudani, Yokohama, Japan

[73] Assignee: Tokico Ltd., Kawasaki, Japan

[21] Appl. No.: 714,325

[22] Filed: Aug. 13, 1976

[30] Foreign Application Priority Data

Aug. 18, 1975  Japan ............................. 50-113528

[51] Int. Cl.² .......................................... F16D 65/02
[52] U.S. Cl. ................................................ 188/73.3
[58] Field of Search ................ 188/72.4, 73.3–73.6, 188/264 B

[56] References Cited
U.S. PATENT DOCUMENTS 3,532,191  10/1970  Burnett et al. ............... 188/264 B X
3,917,033  11/1975  Rath et al. ....................... 188/73.3

Primary Examiner—Duane A. Reger
Attorney, Agent, or Firm—Wenderoth, Lind & Ponack

[57] ABSTRACT

A disc brake has a caliper slidably supported by at least one pin on a stationary supporting member which is secured to a non-rotatable part of a vehicle, and a bushing made of resilient material is disposed between the pin and the inner periphery of a guide hole which receives the pin slidably for attaining relative sliding movement between the caliper and the stationary member, and a plurality of recesses are formed in the periphery of the bushing to retain lubricant therein.

2 Claims, 6 Drawing Figures

DISC BRAKE

This invention relates to improvements in a disc brake of the kind in which one of pads is directly actuated against one surface of a rotatable disc by an actuator, and the other pad is actuated against the opposite surface of the disc through a caliper which is straddling the disc and is slidably supported on a stationary member by at least one pin.

In one known disc brake of the aforementioned kind, the caliper has a pair of pins which are spaced apart from each other in the direction of the circumference of the disc, and a bushing made of resilient material is fitted around the periphery of each of the pins and is slidably engaged with a corresponding guide hole formed in a stationary member which also slidably supports a pair of friction pads for sliding in the direction of the axis of the disc. Since the resilient bushing is fitted in the guide hole with a given tightening interference therebetween, despite the application of lubricant such as grease or the like in the guide hole during the initial assembling, smooth sliding moment of the bushing in the guide hole does not always continue during normal use due to a shortage of lubricant, which leads to incomplete retracting movement of pads as well as uneven wear thereof. This is due to the fact that when the bushing is fitted into the guide hole a major portion of lubricant applied thereon is wiped off.

An object of the present invention is to solve the drawback described by providing a disc brake of the aforementioned kind having a construction such that when the bushing fitted on the pin is inserted into the guide hole, sufficient amount of lubricant will be present between the periphery of the bushing and the inner wall of the guide hole.

The object and feature of the present invention will more clearly be shown from the ensuing specification in conjunction with the accompanying drawings, in which.

Figure 1:
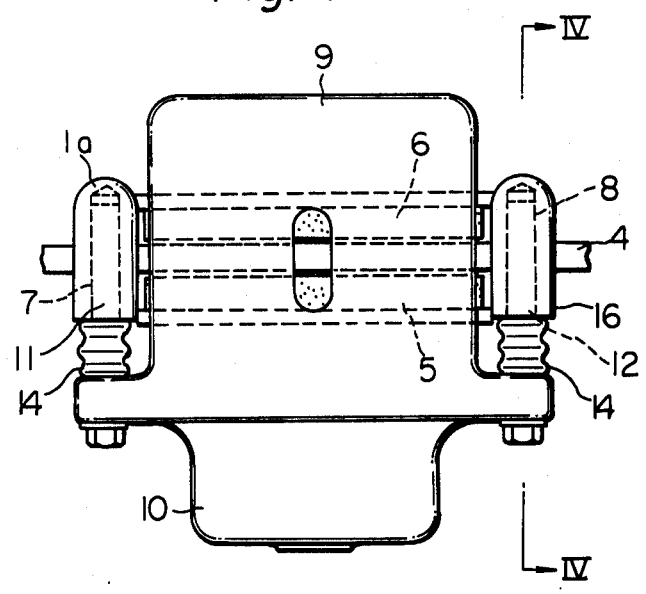
FIG. 1 is a plan view of a disc brake embodying the present invention.
Figure 2:
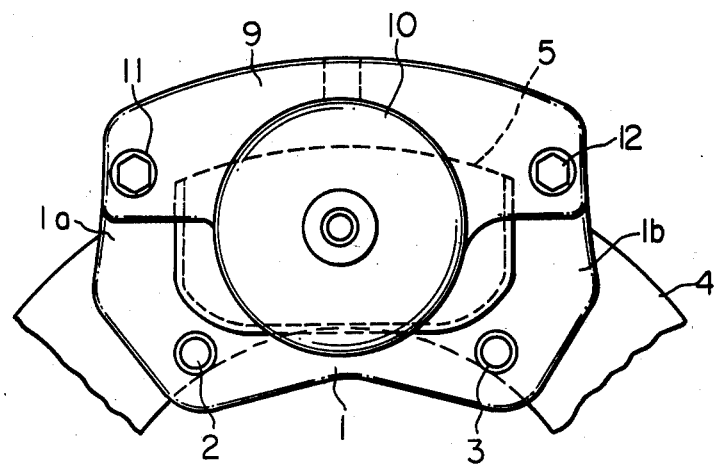
FIG. 2 is a front view of the disc brake of FIG. 1.
Figure 3:
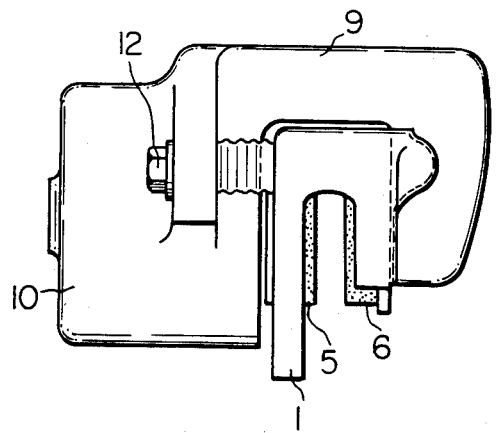
FIG. 3 is a side view of the disc brake of FIG. 1.
Figure 4:
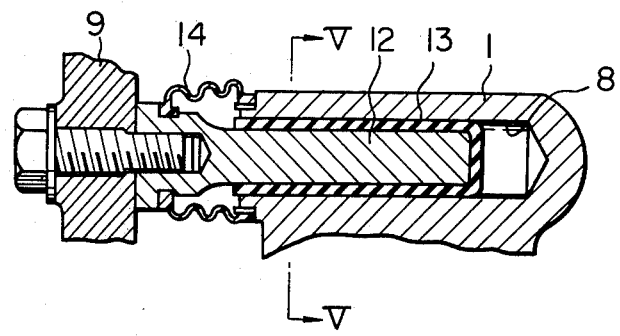
FIG. 4 is a cross-sectional view taken along the line IV—IV in FIG. 1.

Referring to FIGS. 1, 2 and 3, a generally U-shaped stationary member 1 having a pair of arms 1a and 1b on the opposite sides thereof is secured to a non-rotatable part (not shown) of a vehicle such as a spindle knuckle of, for example, a MacPherson type suspension strut by bolts (not shown) passing through two bolt holes 2 and 3. A pair of pads 5 and 6 are carried on the opposite sides of a rotatable disc 4 by the stationary member 1 so as to be slidable in the direction of the axis of the disc 4. The arms 1a and 1b of the stationary member 1 have guide holes 7 and 8, respectively, which extend in the direction of the axis of the disc 4. A caliper 9 having an actuator 10 on one side thereof for urging the pad 5 against the disc 4 straddles a portion of the periphery of the disc 4 and extends on the other side thereof to the back side of the pad 6. A pair of pins 11 and 12 are secured to the caliper 9 and extend in the direction of the disc 4. A bushing 13 made of resilient material is fitted on each of the pins 11 and 12 and is slidably received in the guide hole 7 or 8 in the stationary member 1, as clearly seen in FIG. 4. In this respect, the bushing 13 may be omitted from either of the pins 11 and 12 so that one of the pins is directly received in the guide hole. Boots 14 are provided for preventing admission of water or dust between the inner periphery surface of respective guide holes 7 and 8 and the outer peripheral surface of the bushings 13.

Figure 5:
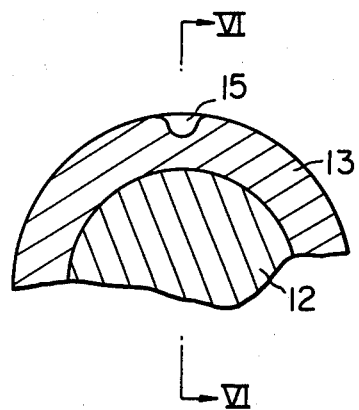
FIG. 5 is a partial cross-sectional view taken along the line V—V in FIG. 4.
Figure 6:
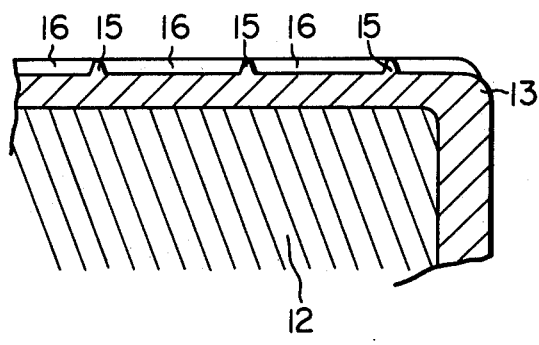
FIG. 6 is a partial cross-sectional view taken along the line VI—VI in FIG. 5.

As is clearly shown in FIGS. 5 and 6, a plurality of aligned recesses 16 are formed in the outer peripheral surface of the bushing 13 extending in the longitudinal direction thereof and are separated by thin partitioning walls 15 respectively to retain lubricant therein. The partitioning walls 15 act to retain lubricant in the majority of recesses 16 even when some of the recesses 16 move out of the guide hole as a result of wear of the pads 5 and 6.

In the embodiment shown, the guide holes 7 and 8 are provided in the stationary member, and a pair of pins 11 and 12 are secured on the caliper 9. As an alternative the pins 11 and 12 may be secured to the stationary member 1 so as to be received in the guide holes formed in the caliper 9. The outer or indirectly actuated pad 6 is slidably mounted on the stationary member 1, but the pad may be mounted on the caliper 9. Further, in the embodiment the bushing 13 fitted on the pin 11 or 12 is slidably received in the guide hole 7 or 8, but the bushing 13 may be fitted in the guide hole 7 or 8 so as to slidably receive the pin 11 or 12 therein. In such a case the recesses 16 should be provided in the inner peripheral surface of the bushing 13. Further, the recesses 16 are shown as longitudinal grooves, but the recesses 16 may be formed as circumferential or annular grooves spaced longitudinally relative to one another.

The disc brake according to the present invention is so arranged that the resilient bushing fitted in the guide hole with a tightening interference therebetween can retain a sufficient amount of lubricant between the bushing and the inner periphery of the guide hole, and thus suitable amount of lubricant can be supplied to relatively sliding surfaces of the bushing and the guide hole, which insures a smooth sliding movement of the caliper relative to the stationary supporting member and can avoid dragging due to incomplete retracting movement of the pads and prevent excessive wear of pads.

What is claimed is:

1. In a disc brake wherein a caliper member is slidably supported by at least one pin on a stationary supporting member which is secured to a non-rotatable part of a vehicle, the pin being on one member and the other member having a guide hole therein slidably receiving the pin, the improvement comprising a bushing of resilient material and positioned between the peripheral surface of said pin and the peripheral surface of the guide hole, said bushing having at least one elongated groove in the peripheral surface thereof and extending in the direction of the axis of said pin for storing lubricant therein for feeding the lubricant between the bushing and the surface slidable relative to the bushing, said groove having longitudinally spaced walls therein partitioning the groove into a plurality of elongated recesses.

2. The improvement according to claim 1 wherein the groove is in the outer periphery of the bushing which is slidably received in the guide hole.

* * * * *